United States Patent
Hiji

(10) Patent No.: US 7,538,900 B2
(45) Date of Patent: May 26, 2009

(54) IMAGE PROCESSING APPARATUS, IMAGE PROCESSING METHOD, AND IMAGE PROCESSING SYSTEM

(75) Inventor: Yoshihiro Hiji, Kawasaki (JP)

(73) Assignee: Fujitsu Microelectronics Limited, Tokyo (JP)

(*) Notice: Subject to any disclaimer, the term of this patent is extended or adjusted under 35 U.S.C. 154(b) by 763 days.

(21) Appl. No.: 10/326,134

(22) Filed: Dec. 23, 2002

(65) Prior Publication Data

US 2003/0161015 A1 Aug. 28, 2003

(30) Foreign Application Priority Data

Feb. 27, 2002 (JP) ............... 2002-051045

(51) Int. Cl.
*H04N 1/40* (2006.01)
(52) U.S. Cl. .................... 358/1.16; 358/1.17
(58) Field of Classification Search ....... 358/1.15–1.17, 358/1.1, 3.2, 538, 404, 443–444
See application file for complete search history.

(56) References Cited

U.S. PATENT DOCUMENTS 6,538,767 B1 * 3/2003 Over et al. ............. 358/1.18

7,116,358 B1 * 10/2006 Sasaki ..................... 348/222.1

FOREIGN PATENT DOCUMENTS

| JP | 7-147662 | 6/1995 |
|---|---|---|
| JP | 2000-152161 | 5/2000 |
| JP | 2001-268485 | 9/2001 |

OTHER PUBLICATIONS

Japanese Office Action issued in JP2002-051045 dated Apr. 17, 2007.

* cited by examiner

*Primary Examiner*—Thomas D Lee
*Assistant Examiner*—Stephen M Brinich
(74) *Attorney, Agent, or Firm*—Staas & Halsey LLP

(57) ABSTRACT

An image processing apparatus includes an image capture apparatus with a reduced size for capturing still image data. An extracting circuit extracts at least an area of still image data. A dividing circuit divides the area extracted by the extracting circuit into a plurality of first through nth areas. A memory circuit has a storage capacity smaller than a storage capacity required to store the still image data, and stores at least a portion of the image data of the first through nth areas provided by the dividing circuit. A transfer circuit transfers the image data stored in the memory circuit to an external device.

13 Claims, 13 Drawing Sheets

FIRST FRAME #1 IS CAPTURED iTH FRAME #i IS CAPTURED

FINAL FRAME #N IS CAPTURED

IMAGE PROCESSING APPARATUS, IMAGE PROCESSING METHOD, AND IMAGE PROCESSING SYSTEM

CROSS-REFERENCE TO RELATED APPLICATIONS

This application is based on, and claims priority to, Japanese Application No. 2002-051045, filed Feb. 27, 2002, in Japan, and which is incorporated herein by reference.

BACKGROUND OF THE INVENTION (1) Field of the Invention

The present invention relates to an image processing apparatus, an image processing method, and an image processing system, and more particularly to an image processing apparatus, an image processing method, and an image processing system for capturing and processing still images.

(2) Description of the Related Art

As the displaying capability of personal computers and the processing capability of CPUs (Central Processing Units) have grown and the storage capacity of hard disks have increased in recent years, expansion cards (so-called video capture apparatus) for reading video data from video units such as video decks as digital data into personal computers are becoming popular in the art.

One problem with a video capture apparatus in reading a high-definition digital video signal into a personal computer is concerned with a data transfer ability required to transfer image data from the video capture apparatus to a memory.

For example, high-definition television signals which have a data rate of about 75 Mpixels per second require a data transfer ability of about 150 Mbytes per second if the amount of data of one pixel is 2 bytes. On the other hand, PCI (Peripheral Components Interconnect) buses which are typically used for systems such as personal computers have a peak data transfer ability of about 132 Mbytes per second for 32-bit signals having an operating frequency of 33 MHz, and a normal data transfer ability which is half the peak data transfer ability or less than half the peak data transfer ability. Therefore, many video capture apparatus temporarily store captured image data in a buffer which has a storage capacity for one frame of image data, and then transfer the captured image data to a memory.

High-definition television signals represent images having a size of 1920×1080 pixels.

Therefore, if the amount of data of one pixel is 2 bytes, then a video capture apparatus needs a buffer having a storage capacity of 4 Mbytes for storing high-definition television signals. When a video capture apparatus is constructed as an LSI (large Scale Integration) circuit, it is the general practice to add a buffer RAM (Random Access Memory) as an external circuit to the LSI circuit. The LSI circuit, therefore, has an increased number of terminals and, as a result, suffers an increased cost.

Since the data of one image is necessarily stored altogether in a buffer at one time, the size of an image that can be captured by a video capture apparatus is limited by the storage capacity of the buffer. Consequently, it is impossible for the video capture apparatus to capture an image whose size is in excess of the storage capacity of the buffer even if the bus from the video capture apparatus to the buffer has an excess data transfer capability.

SUMMARY OF THE INVENTION

It is therefore an object of the present invention to provide an image processing apparatus, an image processing method, and an image processing system which are capable of capturing image data of any size without the need for a large buffer storage capacity.

In order to achieve the above object, there is provided in accordance with an aspect of the present invention an image processing apparatus comprising a dividing circuit for dividing a capture area of still image data into a plurality of first through nth areas in a direction of scanning lines, a memory circuit having a storage capacity smaller than a storage capacity required to store the still image data, for storing at least a portion of the image data of the first through nth areas provided by the dividing circuit, and a transfer circuit for transferring the image data stored in the memory circuit to an external device.

To achieve the above object, there is also provided in accordance with another aspect of the present invention an image processing system comprising an image acquiring apparatus and an image processing apparatus for processing still image data acquired by the image acquiring apparatus. The image acquiring apparatus comprises a dividing circuit for dividing a capture area of still image data into a plurality of first through nth areas in a direction of scanning lines, a first memory circuit having a storage capacity smaller than a storage capacity required to store the still image data, for storing at least a portion of the image data of the first through nth areas provided by the dividing circuit, and a transfer circuit for transferring the image data stored in the first memory circuit to the image processing apparatus. The image processing apparatus comprises a receiving circuit for receiving the image data transferred by the transfer circuit, a second memory circuit having a storage capacity capable of storing the entirety of the still image data, and a restoring circuit for rearranging, as required, the image data received by the receiving circuit and storing the rearranged image data in the second memory circuit to restore the original still image data.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
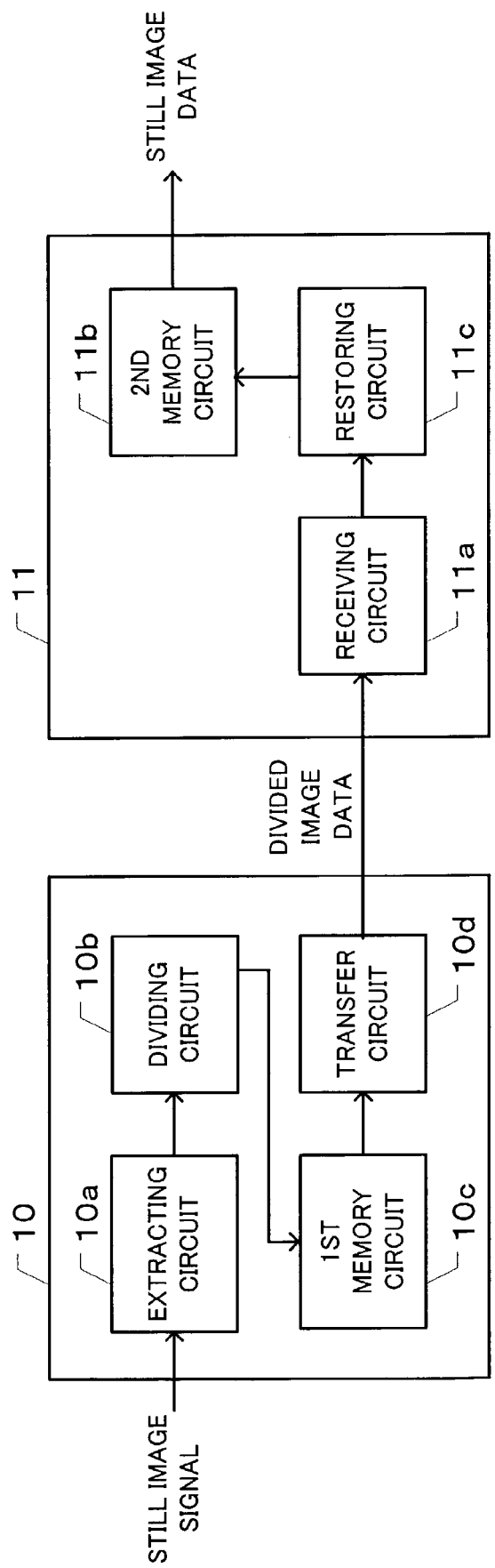
FIG. 1 is a block diagram of an image processing system illustrating the principles of the present invention.

FIG. 1 shows in block form an image processing system illustrating the principles of the present invention. As shown in FIG. 1, the image processing system according to the present invention comprises an image acquiring apparatus 10 and an image processing apparatus 11.

The image acquiring apparatus 10 comprises an extracting circuit 10a, a dividing circuit 10b, a first memory circuit 10c, and a transfer circuit 10d. The image acquiring apparatus 10 is supplied with a still image signal (e.g., a digital video signal), captures (acquires) the supplied still image signal, and supplies the captured still image signal as divided image data to the image processing apparatus 11.

The extracting circuit 10a converts the supplied still image signal into still image data, and extracts at least a certain area of the still image data.

The dividing circuit 10b divides the area of the still image data which has been extracted by the extracting circuit 10a into a plurality of first through nth partial areas.

The first memory circuit 10c has a storage capacity smaller than the storage capacity required to store an overall still image represented by the still image signal, and stores at least a portion of image data in the first through nth partial areas.

The transfer circuit 10d transfers the image data stored in the first memory circuit 10c to the image processing apparatus 11.

The image processing apparatus 11 comprises a receiving circuit 11a, a restoring circuit 11c, and a second memory circuit 11b. The image processing apparatus 11 processes an image acquired by the image acquiring apparatus 10 and outputs the processed image. In the image processing system shown in FIG. 1, the image processing apparatus 11 re-edits divided still image data and outputs the re-edited divided still image data.

The receiving circuit 11a receives image data transferred from the transfer circuit 10d.

The second memory circuit 11b has a storage capacity large enough to store all image data of one frame, which is made up of one or two fields, supplied to the image acquiring apparatus 10.

The restoring circuit 11c changes, if necessary, the sequence of the image data received by the receiving circuit 11a and stores the image data in the second memory circuit 11b, thus restoring the original image data.

Operation of the image processing system shown in FIG. 1 will be described below.

Figure 2:
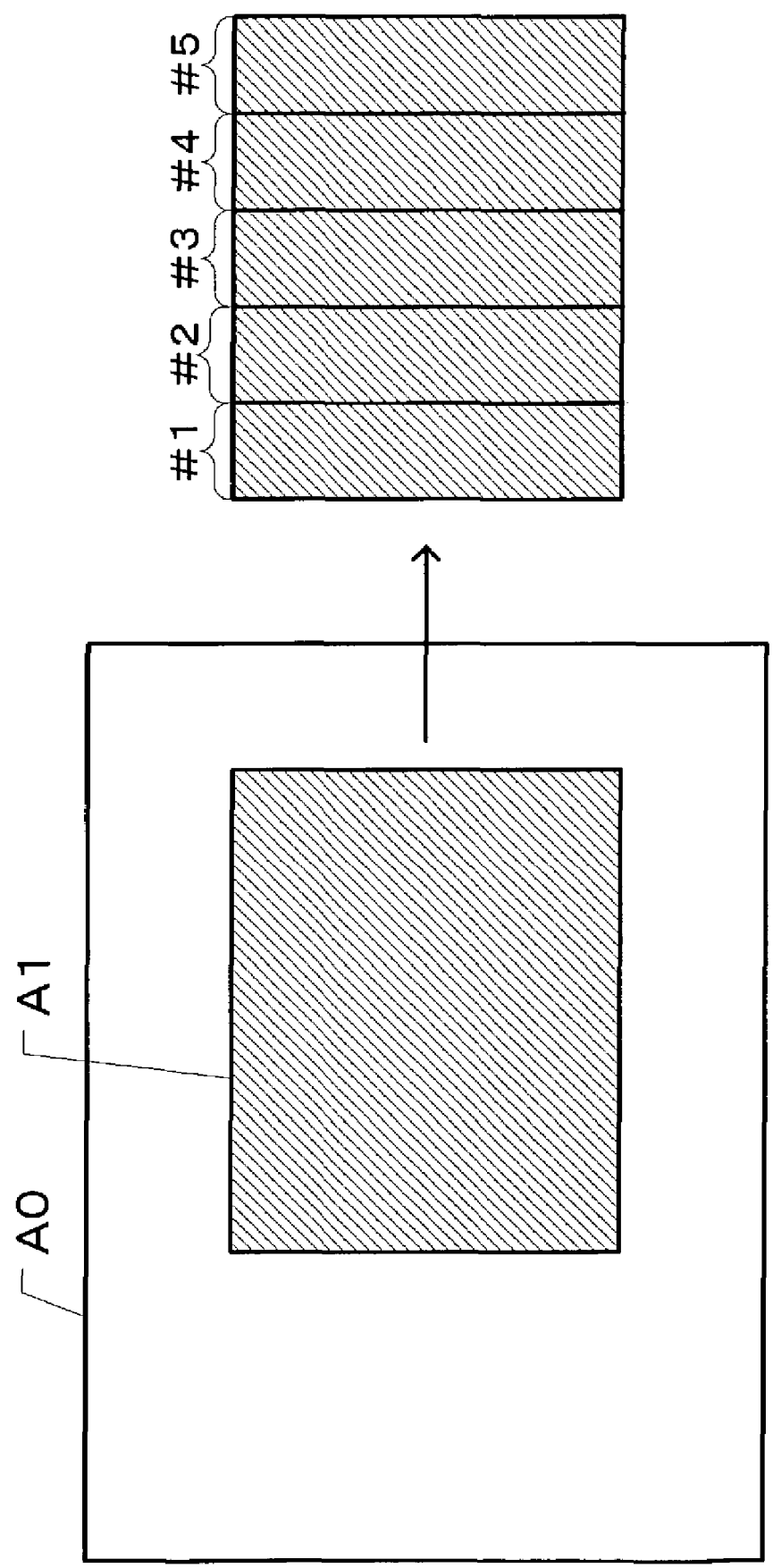
FIG. 2 is a diagram illustrative of the manner in which the system shown in FIG. 1 operates.

When a still image signal having an area A0 shown in FIG. 2 is supplied to the image processing system, the extracting circuit 10a of the image acquiring apparatus 10 converts the image signal having the area A0 into corresponding image data. The extracting circuit 10a also extracts an area A1 to be captured (hereinafter referred to as "capture area"), which is indicated according to a given method, e.g., indicated by a controller, not shown, from the still image signal having the area A0, and supplies the extracted area A1 to the dividing circuit 10b. The extracting circuit 10a may extract any area from the area A0, including the area A0 itself.

The dividing circuit 10b divides the area A1 into a plurality of areas. In FIG. 2, the dividing circuit 10b divides the area A1 into five areas, i.e., an area #1, an area #2 an area #3, an area #4, and an area #5, (hereinafter referred to as "divided areas"). Since a still image signal is a repetition of one frame signal, the dividing circuit 10b extracts one divided area from an image of one frame, and supplies the extracted area to the first memory circuit 10c. The dividing circuit 10b may extract divided areas in any sequence. For example, the dividing circuit 10b may extract divided areas in the sequence of the areas #1 through #5 in FIG. 2 or any other sequence.

The first memory circuit 10c, which has a storage capacity smaller than the storage capacity required to store the still image signal having the area A0 in its entirety, and stores at least a portion of the image of the first through nth areas divided by the dividing circuit 10b. Specifically, the first memory circuit 10c has a storage capacity large enough to store at least one scanning line included in each of the divided areas #1 through #5, and stores the image data supplied from the dividing circuit 10b.

The transfer circuit 10d transfers image data corresponding to one scanning line included in each of the divided areas stored in the first memory circuit 10c to the image processing apparatus 11, during a period of time after the dividing circuit 10b has completed the storage of the image data in the first memory circuit 10c until the dividing circuit 10b starts storing next image data in the first memory circuit 10c.

In the image processing apparatus 11, the receiving circuit 11a receives the divided image data transferred from the transfer circuit 10d of the image acquiring apparatus 10.

The restoring circuit 11c rearranges the divided image data received by the receiving circuit 11a, and stores the rearranged image data in the second memory circuit 11b, thus restoring the original image signal. For example, the divided image data are transferred from the image acquiring apparatus 10 in the order of divided areas #1 through #5. In order to restore the original image signal, these image data need to be stored in memory areas such that their scanning lines are continuous. Therefore, the restoring circuit 11c shuffles the image data into a sequence for making the scanning lines continuous and stores the shuffled image data in the second memory circuit 11b.

The second memory circuit 11b outputs the image data shuffled by the restoring circuit 11c as still image data.

As described above, the image processing system according to the present invention divides still image data into a plurality of areas and transfer the divided areas one at a time. Therefore, the storage capacity of the first memory circuit 10c of the image acquiring apparatus 10 may be smaller than the storage capacity required to store the entire still image data.

Even if the resolution of still image data to be processed is high and hence the amount of still image data is large, the image processing system can capture the still image data regardless of the resolution thereof by repeating the transfer of a basic unit of image data that can be stored in the first memory circuit 10c.

Figure 3:
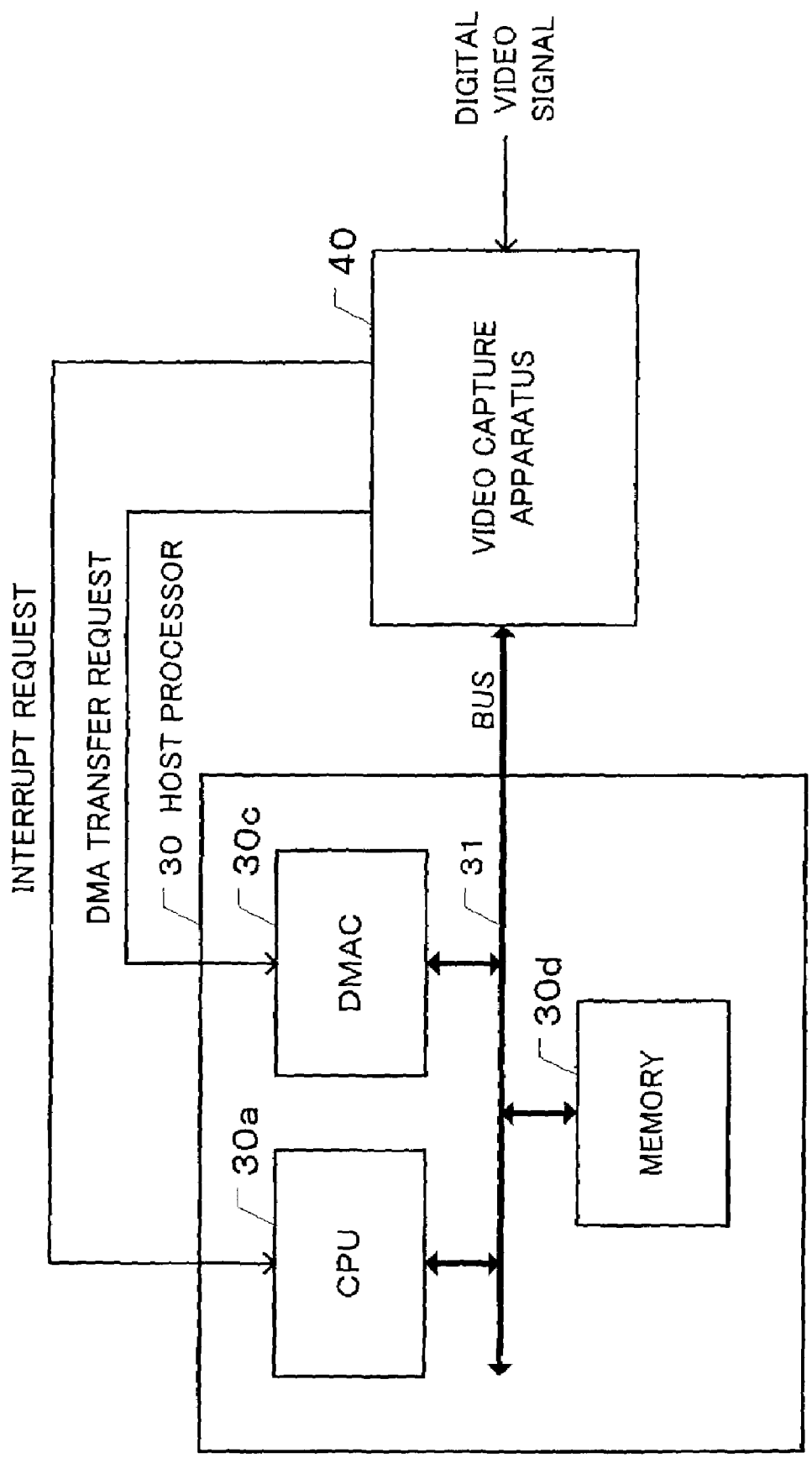
FIG. 3 is a block diagram of an image processing system according to an embodiment of the present invention.

A specific embodiment of the present invention will be described below. FIG. 3 shows in block form an image processing system according to an embodiment of the present invention. As shown in FIG. 3, the image processing system comprises a host processor (image processing apparatus) 30 and a video capture apparatus (image acquiring apparatus) 40.

While the host processor 30 and the video capture apparatus 40 are shown as being independent of each other in FIG. 3, the host processor 30 and the video capture apparatus 40 may be packaged together in a single LSI circuit.

The host processor 30 comprises a CPU 30a, a DMAC (Direct Memory Access Controller) 30c, and a memory 30d. The host processor 30 controls the video capture apparatus 40, receives image data captured by the video capture apparatus 40, and supplies the received image data to another apparatus such as a personal computer or the like.

The CPU 30a controls the video capture apparatus 40 based on a program stored in the memory 30d. The CPU 30a also receives an interrupt request from the video capture apparatus 40 and performs a corresponding interrupt process.

The DMAC 30c serves to transfer the image data captured by the video capture apparatus 40 to the memory 30d based on a DMA transfer request from the video capture apparatus 40.

The memory 30d stores the program that is to be executed by the CPU 30a, and includes a buffer area for storing the image data captured by the video capture apparatus 40.

Figure 4:
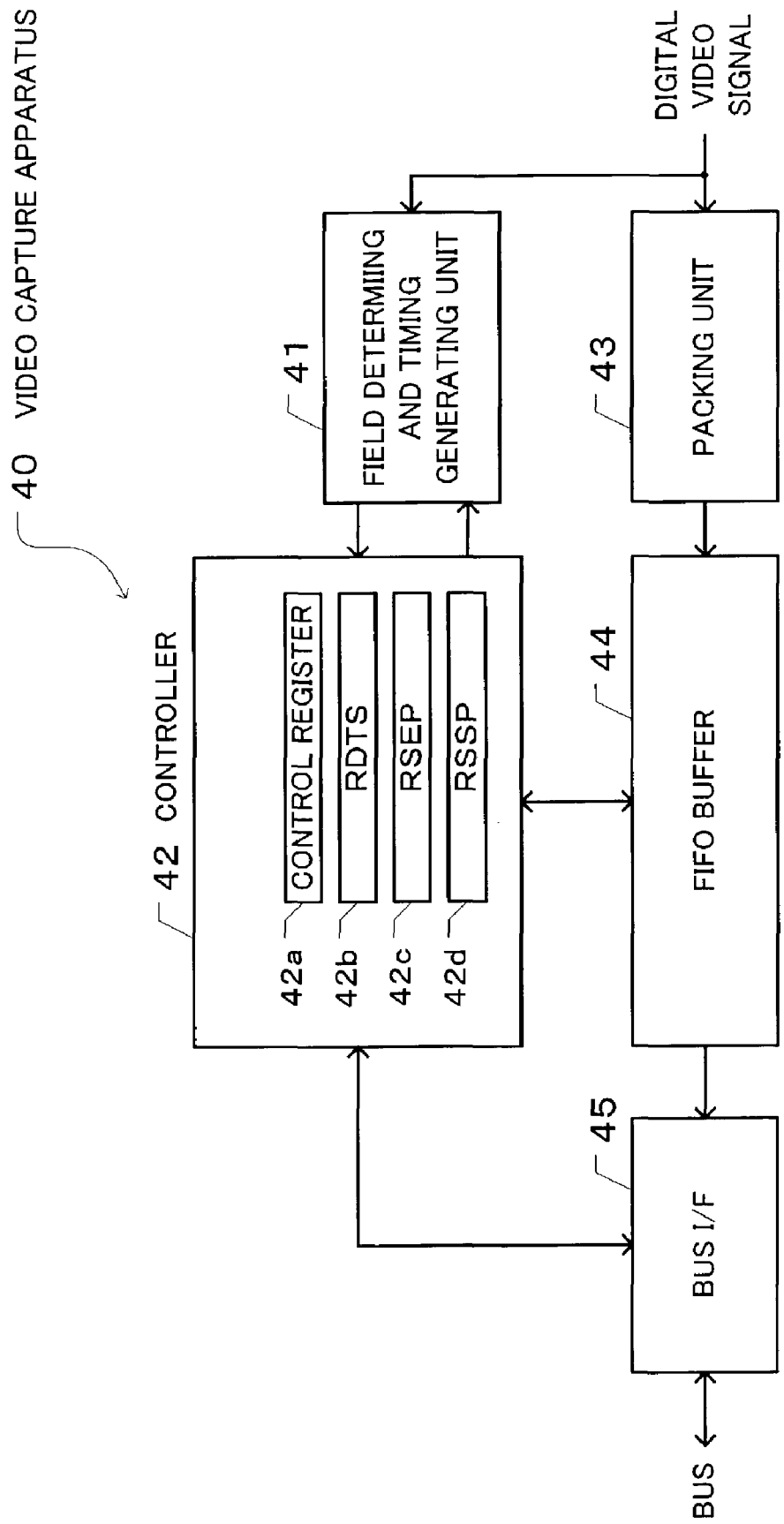
FIG. 4 is a detailed block diagram of a video capture apparatus of the image processing system shown in FIG. 3.

FIG. 4 shows in block form a detailed arrangement of the video capture apparatus 40.

As shown in FIG. 4, the video capture apparatus 40 comprises a field determining and timing generating unit 41, a controller 42, a packing unit 43, an FIFO (First In First Out) buffer 44, and a bus interface (I/F) 45. The video capture apparatus 40 captured a digital video signal supplied thereto, converts the captured digital video signal into corresponding image data, extracts a necessary portion of the image data, and sends the extracted portion to the host processor 30. The video capture apparatus 40 serves as a central part of the present invention.

When the field determining and timing generating unit 41 is supplied with an interlace mode digital video signal, since the interlace mode digital video signal needs to start to be captured from its top field, the field determining and timing generating unit 41 determines the top field from the positional relationship between a horizontal synchronizing signal and a vertical synchronizing signal, and indicates the determined top field to the controller 42.

The controller 42 controls various components of the video capture apparatus 40 based on a request from the host processor 30, and sends an interrupt request and a DMA transfer request to the host processor 30. The controller 42 has a control register 42a, an RDTS 42b, an RSEP 42c, and an RSSP 42d, and exchanges control information for capturing images with the host processor 30 through these registers.

The control register 42a serves to exchange with the host processor 30 information such as a command for starting or stopping an image capturing operation or a command for a control interrupt request. The RDTS 42b serves to exchange with the host processor 30 information for indicating what amount of image data is to be stored in the FIFO buffer 44 before a DMA transfer request is generated. Each of the RSSP 42d and the RSEP 42c comprises two registers, and serves to exchange with the host processor 30 information for indicating which area in the frame is to be captured.

The packing unit 43 rearranges (packs) a digital video signal according to the width of a bus 31, and supplies the packed digital video signal to the FIFO buffer 44. Specifically, the video capture apparatus 40 has two modes, i.e., a mode in which the amount of data per pixel is 16 bits and a mode in which the amount of data per pixel is 24 bits, and the bus 31 has a transfer bit width of 32 bits. Therefore, the transfer unit of the digital video signal needs to be changed according to the width of the bus 31 by the packing unit 43.

The FIFO buffer 44 serves to temporarily store captured image data. If the amount of data which is indicated by the information stored in the RDTS 42b is stored in the FIFO buffer 44, then the controller 42 sends a DMA transfer request to the host processor 30 to ask the host processor 30 to remove the captured image data from the FIFO buffer 44.

The bus I/F 45 serves to allow the CPU 30a to access the control registers or to allow the DMAC 30c to read and transfer acquired data to the memory 30d.

Operation of the image processing system according to the embodiment of the present invention will be described below.

(1) Capturing a progressive scan image:

First, a process of capturing a progressive scan image will be described below.

Figure 5A:
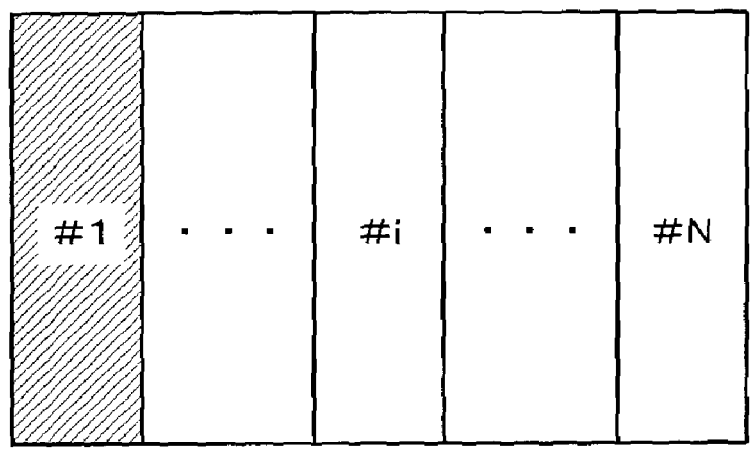
FIGS. 5(A) through 5(C) are diagrams illustrative of a process of capturing image data on the image processing system shown in FIG. 3.

When an image capturing request is sent from a personal computer or the like (not shown), the CPU 30a divides an area to be divided (capture area) into a plurality of elongate rectangular areas (divided areas) depending on the storage capacity of the FIFO buffer 44. For example, assuming that the amount of data of scanning lines is represented by X1 and the amount of data that can be stored in the FIFO buffer 44 is represented by X2, if the value of an INT (X1/X2) where INT is an operator indicating that any numerical values smaller than the decimal point should be rounded up is N, then, as shown in FIG. 5(A), the CPU 30a divides the capture area into N divided areas #1 through #N with respect to the direction of scanning lines. The CPU 30a then determines the X coordinates (coordinates in the horizontal direction of the display screen) of starting and ending points of each of the divided areas, and also determines the amount of data per scanning line of each of the divided areas.

Then, the CPU 30a stores the starting point of the divided area #1 in the RSSP 42d, stores the ending point of the divided area #1 in the RSEP 42c, and stores the amount of data per scanning line of the divided area #1.

The CPU 30a writes a command to start capturing image data in the control register 42a. As a result, the controller 42 requests the field determining and timing generating unit 41 to indicate times depending on the information written in the registers.

The field determining and timing generating unit 41 generates and indicates a time to start capturing image data and a time to end capturing image data to the controller 42, by referring to the information stored in the RSSP 42d and the RSEP 42c, and using the vertical synchronizing (VSYNC) signal and the horizontal synchronizing (HSYNC) signal of the digital video signal as reference information.

Depending on the times to start and end capturing image data which have been supplied from the field determining and timing generating unit 41, the controller 42 extracts divided image data from the digital video signal and stores the extracted image data in the FIFO buffer 44.

Figure 6:
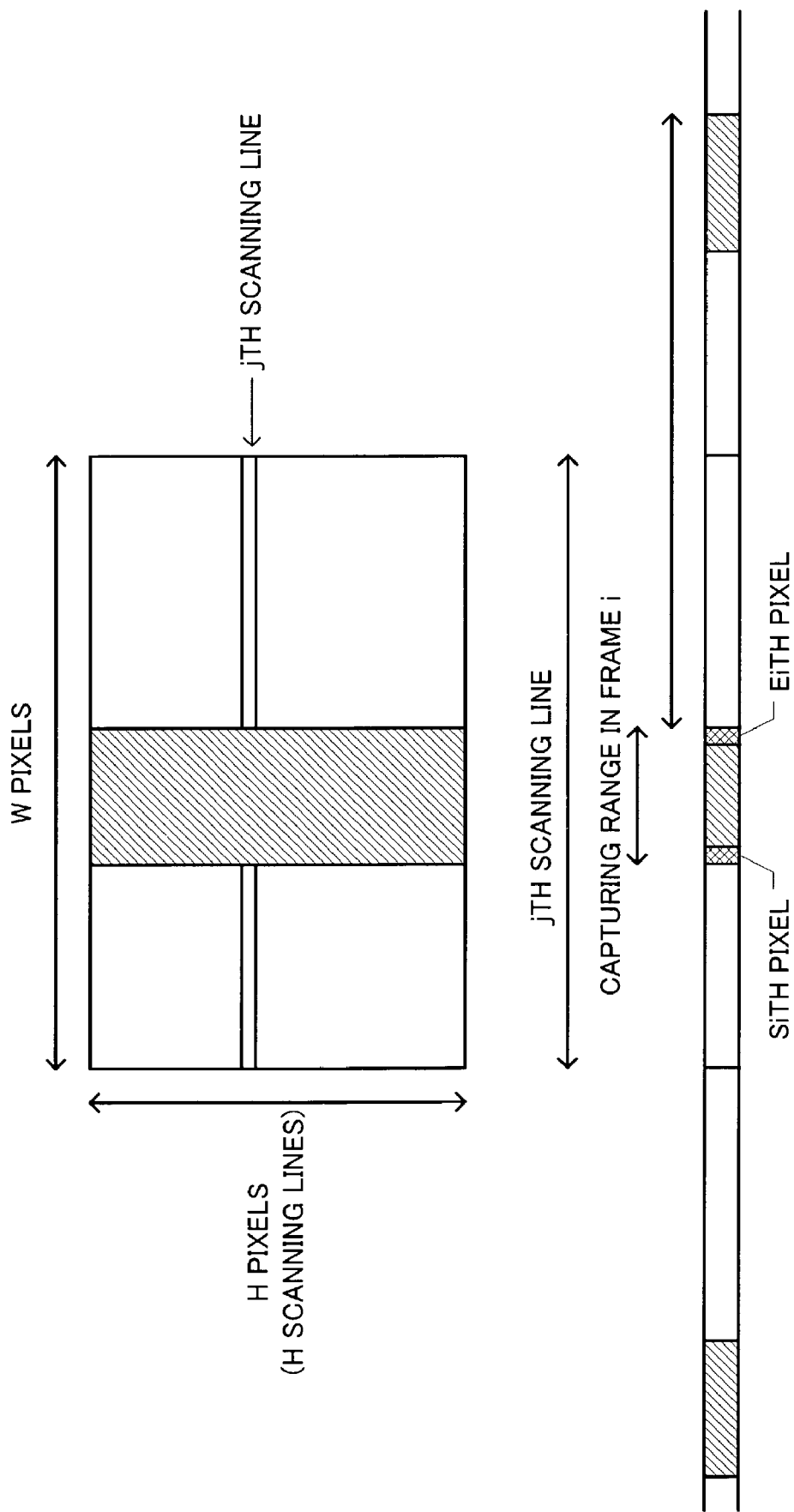
FIG. 6 is a diagram illustrative of a process of capturing image data on the image processing system shown in FIG. 3.

FIG. 6 shows a process of capturing image data in detail. As shown in FIG. 6, when image data comprising W pixels in the horizontal direction and H pixels in the vertical direction is captured, if a divided area to be captured is shown as hatched and a jth scanning line is being presently captured, then image data from an $S_i$th pixel to an $E_i$th pixel (which are shown in a lower portion of FIG. 6) corresponding to the divided area, among the data of the jth scanning line is captured and stored in the FIFO buffer 44.

Figure 7:
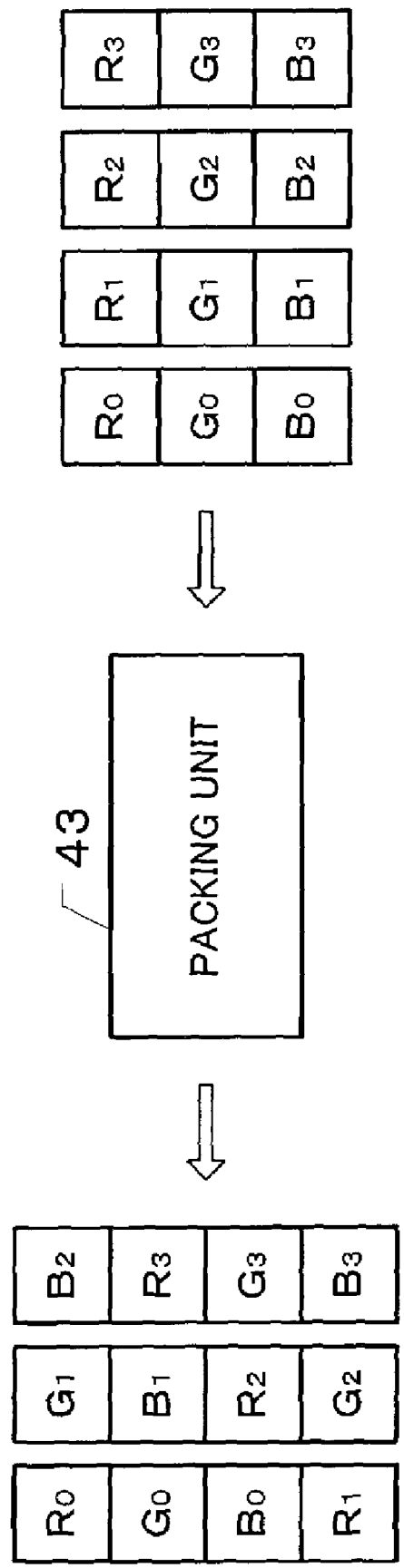
FIG. 7 is a diagram illustrative of a mode of operation of a packing unit of the video capture apparatus shown in FIG. 4.
Figure 8:
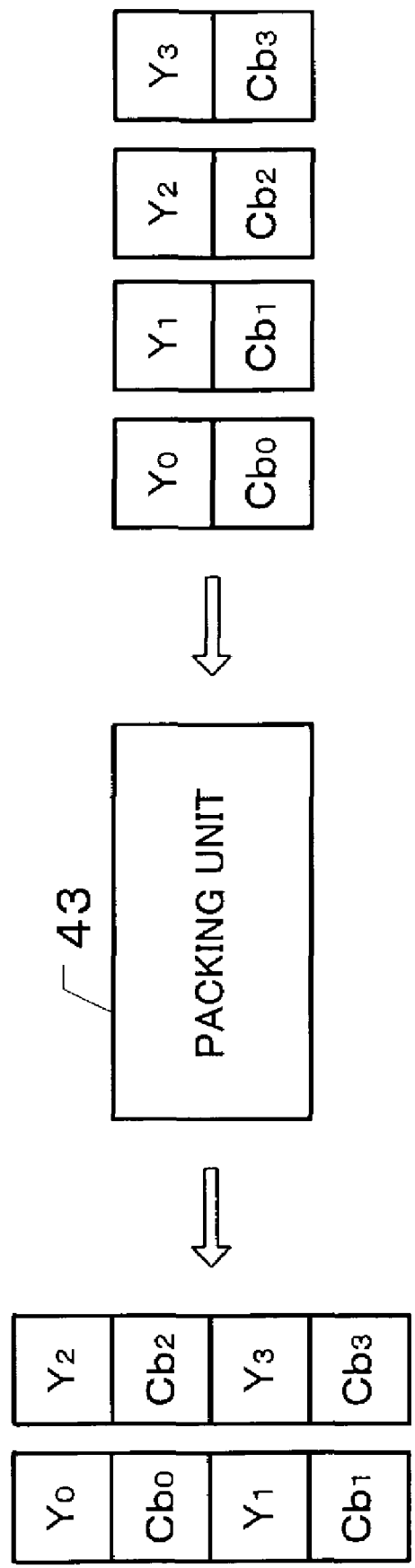
FIG. 8 is a diagram illustrative of an alternative mode of operation of a packing unit of the video capture apparatus shown in FIG. 4.

At this time, the packing unit 43 packs the digital video signal and outputs the packed digital video signal. Specifically, as shown in FIG. 7, the packing unit 43 packs a 3-byte-wide digital video signal (RGB signal) into a 4-byte-wide digital video signal, and outputs the 4-byte-wide digital video signal. Alternatively, as shown in FIG. 8, the packing unit 43 packs a 2-byte-wide digital video signal (CMYK signal) into a 4-byte-wide digital video signal, and outputs the 4-byte-wide digital video signal.

The image data represented by the digital video signal packed by the packing unit 43 is successively stored in the FIFO buffer 44. When the amount of image data stored in the FIFO buffer 44 becomes equal to the data value stored in the RDTS 42b, the controller 42 sends a DMA transfer request to the host processor 30.

As a result, the DMAC 30a transfers the image data stored in the FIFO buffer 44 to a given area in the memory 30d in a DMA transfer mode. The time that can be consumed in the DMA transfer mode continues until a next scanning line starts to be captured. Therefore, if image data to be captured is divided into N image data, then it can be transferred slowly in a time which is (N−1) times the time spent if the image data to be captured were transferred without being divided. Accordingly, high-resolution image data can be transferred independently of the transfer capability of the bus 31.

When all scanning lines of the divided image data have been captured, the CPU 30a rewrites the data stored in the control register 42a to stop the capturing process, and thereafter rewrites the data in the RDTS 42b, the RSEP 42c, and the RSSP 42d of the video capture apparatus 40 depending on the area of the next divided image data. When the rewriting of the data is completed, the CPU 30a writes a command to start capturing image data in the control register 42a. The next divided image data now starts to be captured. For example, when all scanning lines of the divided area #1 have been captured, information corresponding to the divided area #2 is written in the registers, and the image data of the divided area #2 starts being captured.

The above operation is repeated until the image data of all the divided areas #1 through #N have been captured. The processing sequence is finished when the capturing of the image data of all the divided areas #1 through #N is completed.

Figure 9:
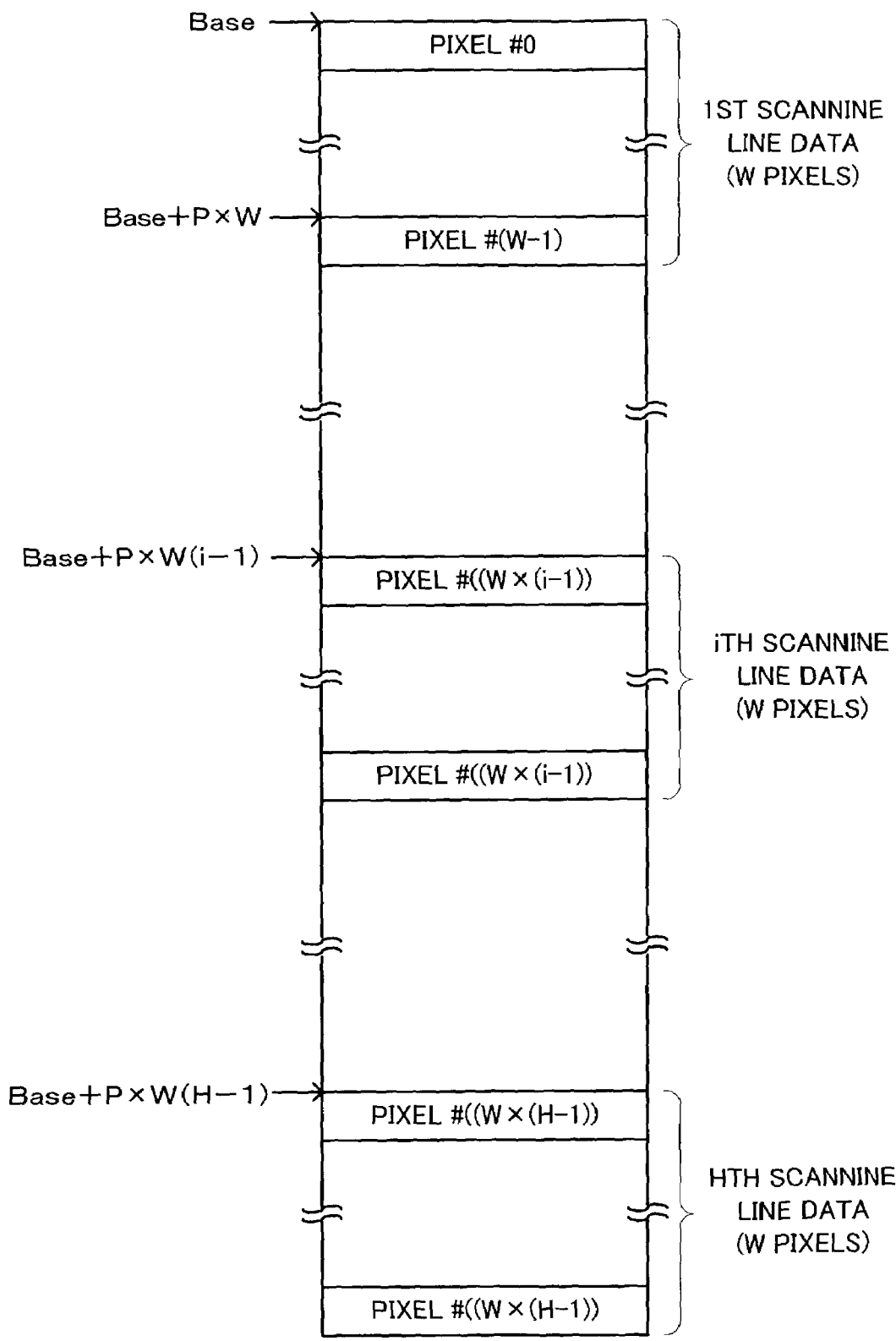
FIG. 9 is a diagram showing a format according to which image data transferred by a normal image capturing process is stored in a memory.

If image data to be captured is not divided but directly captured and transferred to the memory 30d in the DMA transfer mode, then the data illustrated in FIG. 9 is stored in the memory 30d. In FIG. 9, "Base" indicates a leading address of the area in the memory 30d, and "W" and "H" indicate the number of pixels in the horizontal direction and the number of pixels in the vertical direction (the number of scanning lines) respectively. For example, if a digital video signal inputted in an RGB format of 24 bits/pixel is captured, the data of one pixel is 3 bytes large. Since W pixels make up one scanning line, the data of one scanning line is (W×3) bytes large. The data (W×3) bytes multiplied by H make up the data of one image. In this case, therefore, the data ((W×H×3) bytes is transferred to the memory 30d with respect to one image. If a digital video signal of 16 bits/pixel is captured, then the image data is transferred in the same manner as described above except that the data of one pixel is 2 bytes large. Therefore, if image data which is not divided is captured, the image data is stored in terms of scanning lines. Such image data storage is a normal storage mode.

If image data which is divided is captured as with the present embodiment, then since the image data is stored in the memory 30d in terms of divided areas, it is not stored in the normal storage mode. The image data to be captured (1) needs to be rearranged after it has been transferred or (2) needs to be rearranged when transferred so that it will be stored in the normal storage mode.

In the former process (1), after the image data has been transferred, the CPU 30a rearranges the image data to obtain normally arranged image data.

In the latter process (2), either (2-1) the CPU 30a specifies a destination of the DMA transfer mode by the DMAC 30c for each transfer session, or (2-2) a special transfer mode is used if the DMAC 30c has such a special transfer mode.

The special transfer mode in (2-2) will be described below. If the DMAC 30c has a so-called "two-dimensional transfer mode," then this two-dimensional transfer mode is used to rearrange image data when it is transferred.

One example of DMAC having such a transfer mode is a built-in DMAC included in "MB93401A" manufactured by Fujitsu. In the two-dimensional transfer mode of this DMAC, it is necessary to set a register DBR for specifying a leading address of the memory 30d as a transfer destination, a register BCL for specifying the number of transfer bytes per scanning line, a register APR for specifying the total number of bytes of data that make up one scanning line, a register SIX for specifying the number of scanning lines, a register SBR for specifying the address of a transfer source, and a register SIZ for indicating a unit of transfer operation. In addition to these registers involved in the two-dimensional transfer mode, there is a register PIX for indicating how much image data has been transferred in a scanning line. The register PIX needs to be set to "0" when the image data starts to be transferred. Detailed settings of the registers are described below:

BCL is set to $(E_i-S_i+1)\times$(the number of bytes per pixel).

APR is set to (W×(the number of bytes per pixel). (For capturing an interlaced scan image, the register APR is set to 2×W×(the number of bytes per pixel) to place image data for every other scanning line.

SIX is set to the number H of scanning lines.

SBR is set to the address on the bus of the video capture apparatus 40.

SIZ is set to a value which is the same as the value set in the RDTS 42b of the video capture apparatus 40 shown in FIG. 4.

DBR is set to the address where an $S_i$th pixel of the first scanning line captured in a field. For capturing a progressive scan frame (as with capturing an interlace scan top field), the register DBR is set to Base (which represents the address of an $S_i$th pixel of the first scanning line)+$(S_i\times$(the number of bytes per pixel)). For capturing an interlace scan bottom field, the register DBR is set to Base (which represents the address of an $S_i$th pixel of the second scanning line)+$(W+S_i)\times$(the number of bytes per pixel).

Figure 5B:
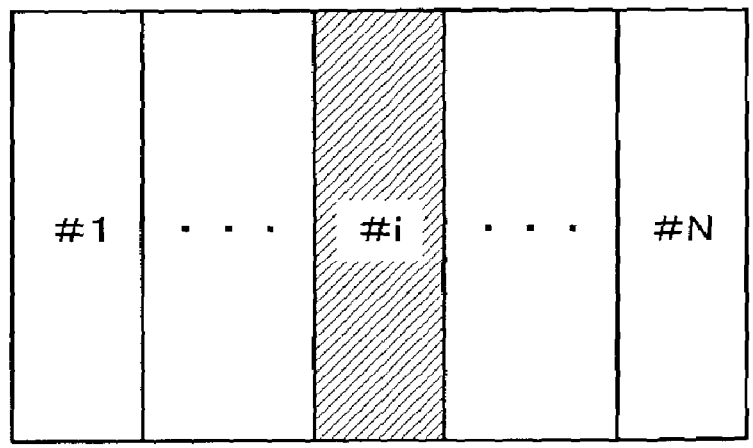
Figure 5C:
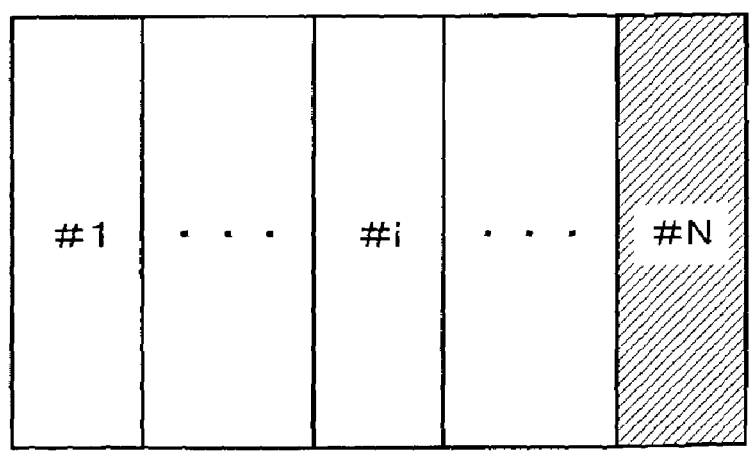

Since an area to be captured in image data needs to be moved for each field (frame) as shown in FIGS. 5(A) through 5(C), the video capture apparatus 40 and the DMAC 30c need to be set for each field (frame) according to software. Details of such a setting process will be described later on with reference to FIG. 13.

By rearranging image data as described above, it is possible to obtain image data arranged for normal storage mode. The image data thus stored in the memory 30d is read therefrom depending on a request from a personal computer, not shown.

In the above embodiment, as described above, because a capture area is divided into a plurality of divided areas, and image data in each of the divided areas is captured. Therefore, it is possible to reduce the storage capacity of the FIFO 44. As a result, the size of the entire video capture apparatus 40 can be reduced.

If image data in each of the divided areas is transferred in terms of scanning lines in the DMA transfer mode, then since a sufficient transfer time is available, the image data can be transferred with a sufficient margin even when the transfer capability of the bus 31 is low or high-definition image data is transferred.

The relationship between the transfer capability of the bus 31 and the FIFO buffer 44 is as follows:

As shown in FIG. 6, it is assumed, for example, that an image has a size represented by W pixels in the horizontal direction and H pixels in the vertical direction, and the image is to be captured in N frames (N>1), as shown in FIGS. 5(A) through 5(C). It is also assumed, as shown in FIG. 6, that an image data range from the $S_i$th pixel to the $E_i$th pixel in the horizontal direction in an ith frame ($1 \leq i \leq N$) is to be captured ($1 \leq S_i \leq W$, $1 \leq E_i \leq W$, $S_i \leq E_i$, $\Sigma(E_i - S_i + 1) = W$).

With digital video signals, pixels are inputted serially at a constant rate P. W pixels that make up one scanning line are captured by the video capture apparatus according to the present invention as follows:

Step S1: After the horizontal synchronizing (HSYNC) signal is detected, ($S_i - 1$) pixels are skipped.

Step S2: ($E_i - S_i + 1$) pixels are captured.

Step S3: The captured pixels start to be transferred. Concurrent with the process of step S1 for the next scanning line, the ($E_i - S_i + 1$) pixels are transferred to the host processor 30 in a time corresponding to the (W−($E_i - S_i + 1$)) pixels.

The operation in steps S1 through S3 is repeated as many times as the number of scanning lines that make up the image, thus completing the transfer of the data of one divided image area.

If the bus 31 has a transfer capability $T_{BUS}$(bytes/s), the pixels are inputted at a rate $P(s^{-1})$, and the amount of data per pixel is represented by B (bytes), then the image data can be captured without causing an overflow from the FIFO 44 by setting $E_i$, $S_i$ to satisfy the relationship: $((E_i - S_i + 1) \div W) < (T_{BUS} \div (P \times B))$.

(2) Capturing an interlaced scan image:

First, a process of capturing an interlaced scan image will be described below.

When an image capturing request is sent from a personal computer or the like (not shown), the CPU 30a divides an area to be divided (capture area) into a plurality of elongate rectangular areas (divided areas) depending on the storage capacity of the FIFO buffer 44 as with the above process of capturing a progressive scan image. For example, the CPU 30a divides the capture area into N divided areas #1 through #N with respect to the direction of scanning lines, as shown in FIG. 5(A). The CPU 30a then determines the X coordinates (coordinates in the horizontal direction of the display screen) of starting and ending points of each of the divided areas, and also determines the amount of data per scanning line of each of the divided areas.

Then, the CPU 30a stores the starting point of the divided area #1 in the RSSP 42d, stores the ending point of the divided area #1 in the RSEP 42c, and stores the amount of data per scanning line of the divided area #1.

The CPU 30a writes a command to start capturing image data in the control register 42a. As a result, the controller 42 requests the field determining and timing generating unit 41 to indicate times depending on the information written in the registers.

The field determining and timing generating unit 41 generates and indicates a time to start capturing image data and a time to end capturing image data to the controller 42, by referring to the information stored in the RSSP 42d and the RSEP 42c, and using the vertical synchronizing (VSYNC) signal and the horizontal synchronizing (HSYNC) signal of the digital video signal as reference information.

With interlaced scan images, since one frame is made up of two fields (a top field and a bottom field), the field determining and timing generating unit 41 is required to send information indicative of a top field or a bottom field to the controller 42.

Depending on the times to start and end capturing image data and the field information which have been supplied from the field determining and timing generating unit 41, the controller 42 extracts divided image data, in the order of top and bottom fields, from the digital video signal and stores the extracted image data in the FIFO buffer 44. At this time, the pack unit 43 packs and outputs the digital video signal as described above.

The image data represented by the digital video signal packed by the packing unit 43 is successively stored in the FIFO buffer 44. When the amount of image data stored in the FIFO buffer 44 becomes equal to the data value stored in the RDTS 42b, the controller 42 sends a DMA transfer request to the host processor 30.

As a result, the DMAC 30a transfers the image data stored in the FIFO buffer 44 to a given area in the memory 30d in a DMA transfer mode. The time that can be consumed in the DMA transfer mode continues until a next scanning line starts to be captured. Therefore, if image data to be captured is divided into N image data, then it can be transferred slowly in a time which is (N−1) times the time spent if the image data to be captured were transferred without being divided. Accordingly, high-resolution image data can be transferred independently of the transfer capability of the bus 31.

When all scanning lines of the divided image data have been captured, the CPU 30a rewrites the data stored in the control register 42a to stop the capturing process, and thereafter rewrites the data in the RDTS 42b, the RSEP 42c, and the RSSP 42d of the video capture apparatus 40 depending on the same divided area of the next field (the bottom field in this example). When the rewriting of the data is completed, the CPU 30a writes a command to start capturing image data in the control register 42a. The same divided area of the next field now starts to be captured. If different transfer destination addresses for different fields are specified in the memory 30d, then the image data of the top and bottom fields are separately stored in the memory 30d.

The above operation is repeated until the image data of the top and bottom fields of all the divided areas #1 through #N have been captured. The processing sequence is finished when the capturing of the image data of the both fields of all the divided areas #1 through #N is completed.

The image data may be rearranged for each of the fields in the same manner as with the image data of the progressive scan image.

With the present embodiment, as described above, even if the inputted digital video signal is an interlaced scan image signal, the video capture apparatus 40 can capture the inputted digital video signal. As with capturing the progressive scan image signal described above, the video capture apparatus 40 for capturing the interlaced scan image signal can be reduced in size.

Processing sequences of the video capture system according to the above embodiment will be described below.

Figure 10:
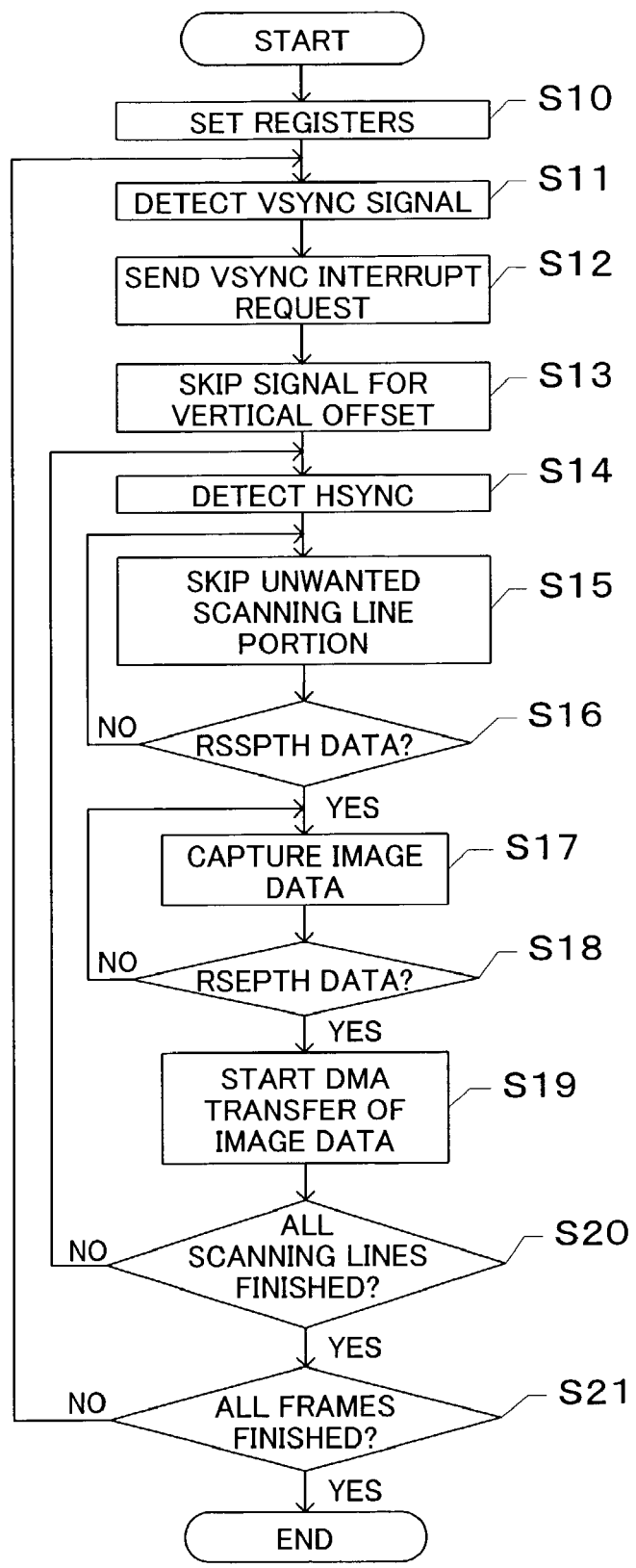
FIG. 10 is a flowchart of a processing sequence for capturing a progressive scan image.

FIG. 10 shows a processing sequence for capturing a progressive scan image. When the processing sequence shown in FIG. 10 is started, its successive steps are carried out as follows:

Step S10: The CPU 30a sets the various registers of the video capture apparatus 40 depending on image data to be transferred.

Step S11: The field determining and timing generating unit 41 detects a vertical synchronizing (VSYNC) signal.

Step S12: The field determining and timing generating unit 41 sends a VSYNC interrupt request indicative of the detected VSYNC signal to the controller 42.

Step S13: The field determining and timing generating unit 41 skips the inputted digital video signal for an interval corresponding to a vertical offset of the digital video signal in order to remove a vertical blanking period from the digital video signal.

Step S14: The field determining and timing generating unit 41 detects a horizontal synchronizing (HSYNC) signal.

Step S15: The field determining and timing generating unit 41 skips an unwanted portion of the scanning line (an area preceding the divided area to be captured).

Step S16: The field determining and timing generating unit 41 determines whether the image data is data (RSSPth data) specified by the value stored in the RSSP 42d or not. If the image data is the RSSPth data, then control proceeds to step S17. Otherwise, control returns to step S15 to repeat steps S15, S16.

Step S17: The controller 42 performs a capturing process to store the data inputted from the packing unit 43 in the FIFO buffer 44.

Step S18: The field determining and timing generating unit 41 determines whether the image data is data (RSEPth data) specified by the value stored in the RSEP 42c or not. If the image data is the RSEPth data, then control proceeds to step S19. Otherwise, control returns to step S17 to repeat steps S17, S18.

Step S19: The controller 42 sends a DMA transfer request to the DMAC 30c. As a result, the DMAC 30c starts transferring the data stored in the FIFO buffer 44 to the memory 30c in the DMA transfer mode.

Step S20: The controller 42 determines whether the image data of all the scanning lines included in the divided area have been captured or not. If the image data of all the scanning lines included in the divided area have not been captured, then control returns to step S14 to capture the image data of the next scanning line. Otherwise, control goes to step S21.

Step S21: The controller 42 determines whether the image data of all the divided areas included in the frame have been captured or not. If the image data of all the divided areas included in the frame have not been captured, then control returns to step S11 to capture the image data of the next divided area. Otherwise, the processing sequence is put to an end.

According to the processing sequence shown in FIG. 10, it is possible to divide a progressive scan image into a plurality of areas and capture the image data thereof.

Figure 11:
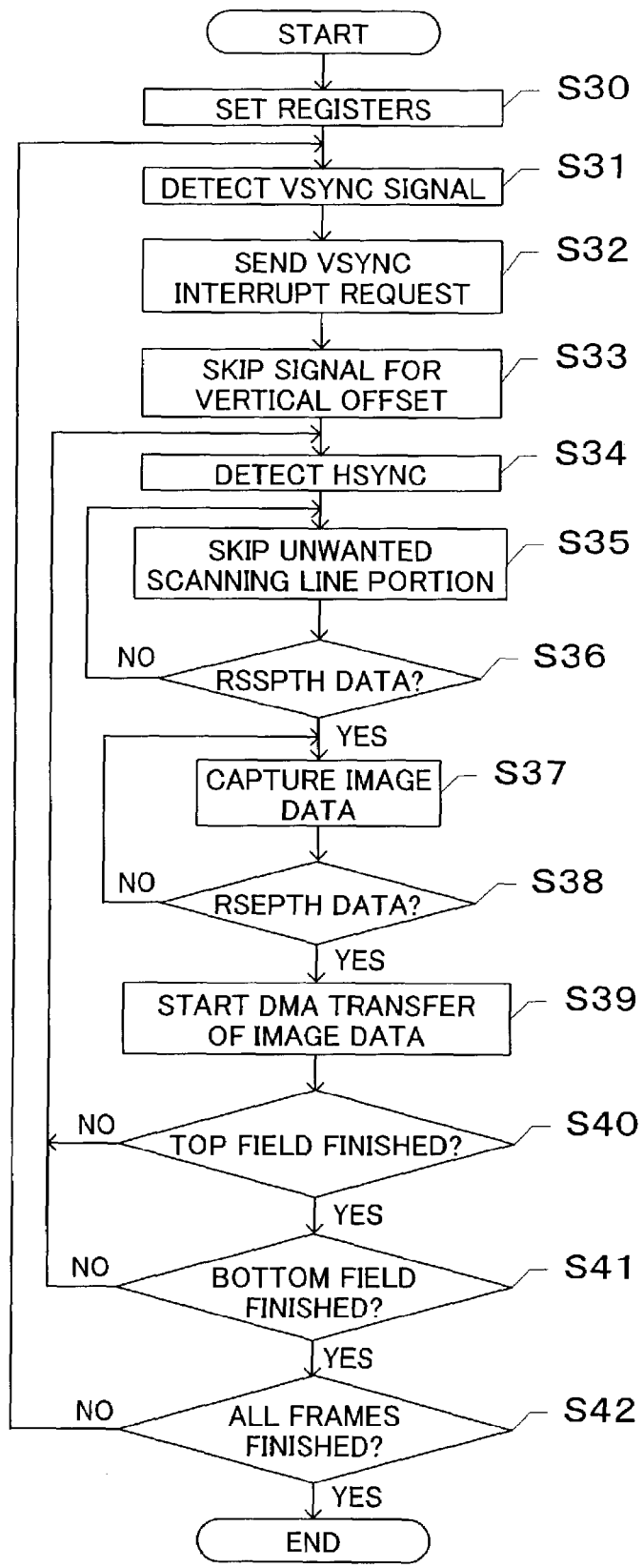
FIG. 11 is a flowchart of a processing sequence for capturing an interlaced scan image.

FIG. 11 shows a processing sequence for capturing an interlaced scan image. When the processing sequence shown in FIG. 11 is started, its successive steps are carried out as follows:

Step S30: The CPU 30a sets the various registers of the video capture apparatus 40 depending on image data to be transferred.

Step S31: The field determining and timing generating unit 41 detects a vertical synchronizing (VSYNC) signal.

Step S32: The field determining and timing generating unit 41 sends a VSYNC interrupt request indicative of the detected VSYNC signal to the controller 42.

Step S33: The field determining and timing generating unit 41 skips the inputted digital video signal for an interval corresponding to a vertical offset of the digital video signal in order to remove a vertical blanking period from the digital video signal.

Step S34: The field determining and timing generating unit 41 detects a horizontal synchronizing (HSYNC) signal.

Step S35: The field determining and timing generating unit 41 skips an unwanted portion of the scanning line (an area preceding the divided area to be captured).

Step S36: The field determining and timing generating unit 41 determines whether the image data is data (RSSPth data) specified by the value stored in the RSSP 42d or not. If the image data is the RSSPth data, then control proceeds to step S37. Otherwise, control returns to step S35 to repeat steps S35, S36.

Step S37: The controller 42 performs a capturing process to store the data inputted from the packing unit 43 in the FIFO buffer 44.

Step S38: The field determining and timing generating unit 41 determines whether the image data is data (RSEPth data) specified by the value stored in the RSEP 42c or not. If the image data is the RSEPth data, then control proceeds to step S39. Otherwise, control returns to step S37 to repeat steps S37, S38.

Step S39: The controller 42 sends a DMA transfer request to the DMAC 30c. As a result, the DMAC 30c starts transferring the data stored in the FIFO buffer 44 to the memory 30c in the DMA transfer mode.

Step S40: The controller 42 determines whether the image data of all the scanning lines included in the top field have been captured or not. If the image data of all the scanning lines included in the top field have been captured, then control goes to step S41. Otherwise, control returns to step S34 to capture the image data of the next scanning line.

Step S41: The controller 42 determines whether the image data of all the scanning lines included in the bottom field have been captured or not. If the image data of all the scanning lines included in the bottom field have been captured, then control goes to step S42. Otherwise, control returns to step S34 to capture the image data of the next scanning line.

Step S42: The controller 42 determines whether the image data of all the divided areas included in the frame have been captured or not. If the image data of all the divided areas included in the frame have not been captured, then control returns to step S31 to capture the image data of the next divided area. Otherwise, the processing sequence is put to an end.

According to the processing sequence shown in FIG. 11, it is possible to divide an interlaced scan image into a plurality of areas and capture the image data thereof.

Figure 12:
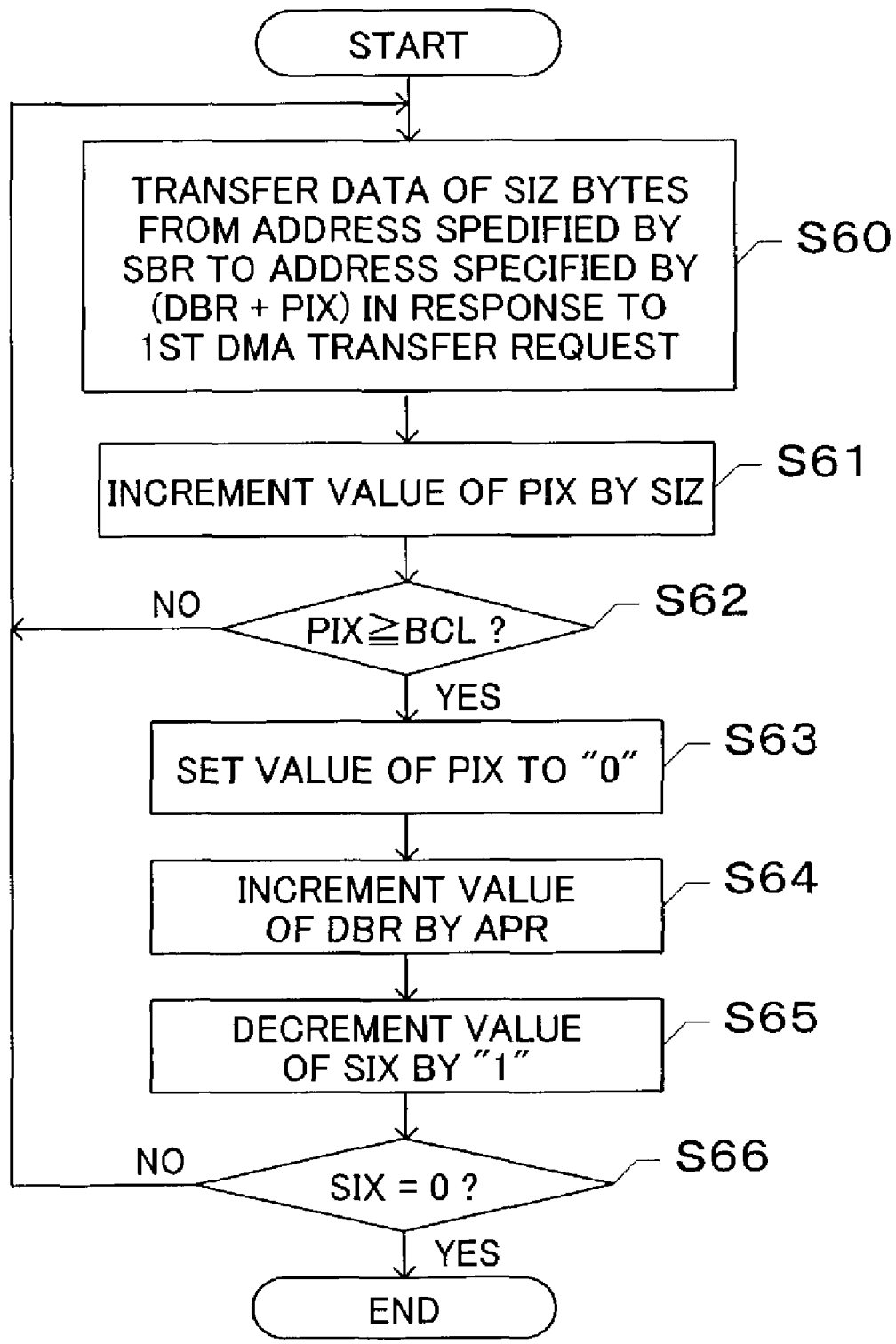
FIG. 12 is a flowchart of a processing sequence of a DMAC of the image processing system shown in FIG. 3 for two-dimensional data transfer.

A processing sequence of the DMAC 30c for two-dimensional data transfer will be described below with reference to FIG. 12. When the processing sequence shown in FIG. 12 is started, its successive steps are carried out as follows:

Step S60: In response to a first DMA transfer request, the CPU 30a transfers data of SIZ bytes (the data size transferred at one time) from an address specified by SBR (the address of a transfer source) to an address specified by (DBR+PIX) (the leading address of a transfer destination+the present transfer position on the scanning line).

Step S61: The DMAC 30c increments the value of PIX by the value of SIZ.

Step S62: The DMAC 30c determines whether or not the value of PIX is equal to or greater than BCL (the number of transfer bytes per scanning line). If the value of PIX is equal to or greater than BCL, then control goes to step S63. Otherwise, control goes back to step S60.

Step S63: The DMAC 30c sets the value of PIX to "0."

Step S64: The DMAC 30c increments the value of DBR (the leading address of the memory 30d as a transfer destination) by the value of APR (the total number of bytes of data that make up one scanning line).

Step S65: The DMAC 30c decrements the value of SIX by "1."

Step S66: The DMAC 30c determines whether the value of SIX becomes "0" or not. If the value of SIX becomes "0," then the processing sequence is put to an end. Otherwise, control returns to step S60 to repeat the processing sequence.

Figure 13:
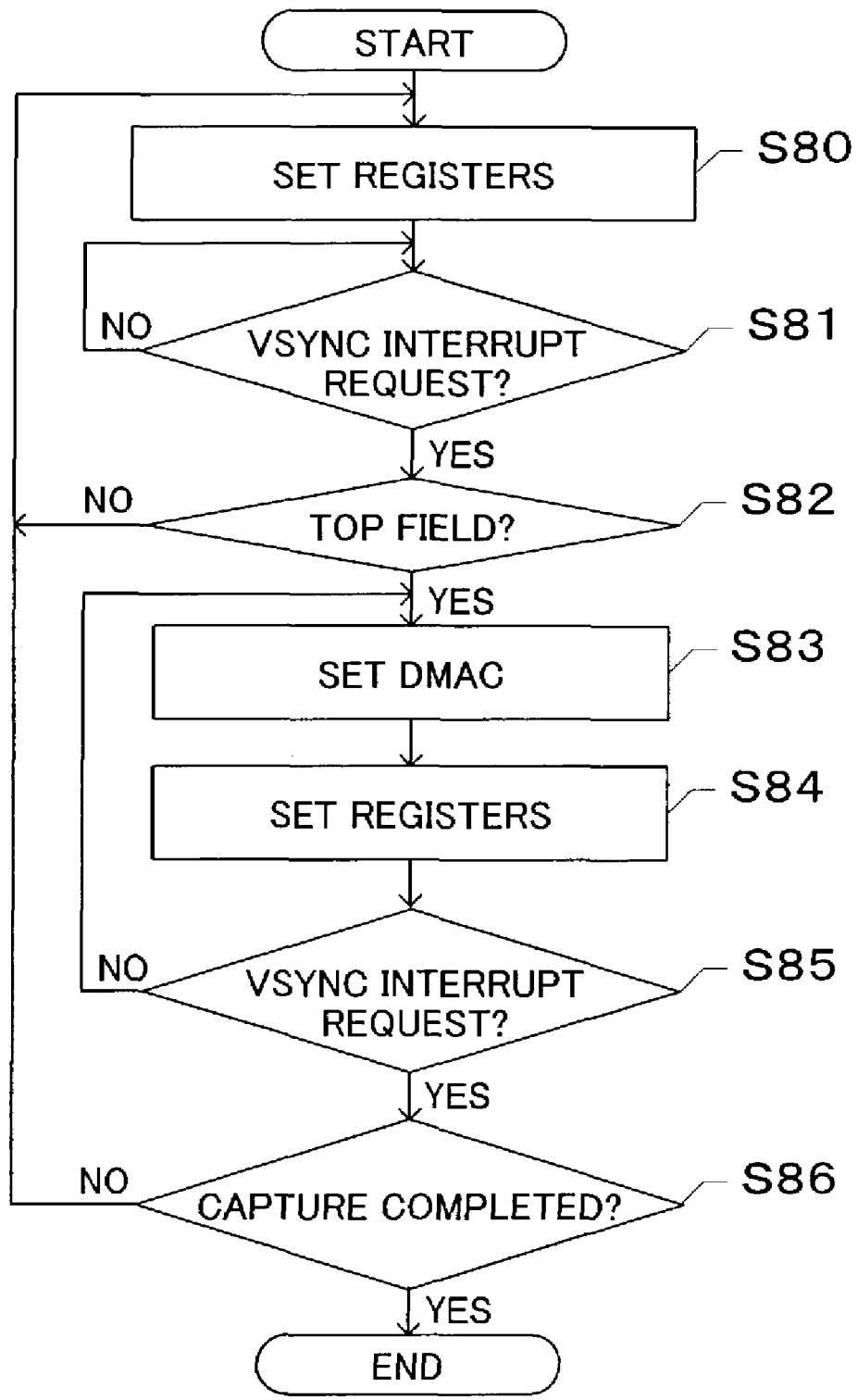
FIG. 13 is a flowchart of a processing sequence for setting the video capture apparatus and the DMAC for every field (frame).

A processing sequence for setting the video capture apparatus 40 and the DMAC 30c for every field (frame) will be described below with reference to FIG. 13. The processing sequence shown in FIG. 13 is a process for moving an image area to be captured for each field (frame) as shown in FIGS. 5(A) through 5(C). When the processing sequence shown in FIG. 13 is started, its successive steps are carried out as follows:

Step S80: The CPU 30a sets the various registers of the video capture apparatus 40.

Step S81: The controller 42 determines whether there is a VSYNC interrupt request from the field determining and timing generating unit 41 or not. If there is a VSYNC interrupt request from the field determining and timing generating unit 41, then control proceeds to step S82. Otherwise, the operation in steps S80, S81 is repeated.

Step S82: The controller 42 determines whether the currently inputted digital video signal is a signal of a top field or not. If the currently inputted digital video signal is a signal of a top field, then control goes to step S83. Otherwise, control goes back to step S80.

Step S83: The CPU 30a sets the various registers of the DMAC 30c.

Step S84: The CPU 30a sets the various registers of the controller 42.

Step S85: The controller 42 determines whether there is a VSYNC interrupt request from the field determining and timing generating unit 41 or not. If there is a VSYNC interrupt request from the field determining and timing generating unit 41, then control proceeds to step S86. Otherwise, the operation in steps S83, S84, S85 is repeated.

Step S86: The controller 42 determines whether the capturing of the image data is completed or not. If not completed, then control returns to step S80 to repeat the processing sequence. Otherwise, the processing sequence is put to an end.

The processing sequence shown in FIG. 13 allows the DMAC 30c to transfer image data in a two-dimensional transfer mode. Therefore, it is not necessary to rearrange or shuffle the data stored in the memory 30c. Consequently, for example, the time after the personal computer has demanded an image capture until it actually receives desired image data can be reduced.

According to the present invention, as described above, the storage capacity of the FIFO buffer 44 can be selected independently of the size of an image to be captured. Particularly, since an image to be captured is divided horizontally, the storage capacity of the buffer can be made smaller than the data of W pixels. Therefore, the problem that a large-capacity buffer is required and the problem that the size of an image that can be captured is limited by the buffer capacity are eliminated.

In the above embodiment, a range for capturing image data in a frame (or a field) can be changed by a program for each frame (or field). In this manner, the transfer capability of a bus required by the capturing process can be adjusted. Specifically, the range $((E_i-S_i+1))$ for capturing image data in one frame is adjusted depending on the available transfer capability of the bus 31 for thereby adjusting the ratio at which the video capture apparatus 40 occupies the bus 31.

In the above embodiment, image data in terms of scanning lines making up divided areas is transferred in the DMA transfer mode. However, the present invention is also applicable to other image data transfer schemes.

For example, the FIFO buffer 44 may comprise a memory having banks, and while image data from the packing unit 43 is being written in one of the banks, image data stored in the other bank may be transferred to the memory 30c in the DMA transfer mode. In this case, the image data is transferred in terms of divided areas.

If the FIFO buffer 44 comprises a dual-port memory capable of reading and writing image data simultaneously, then it is possible to simultaneously write image data from the packing unit 43 in the FIFO buffer 44 and transfer written data from the FIFO buffer 44 to the memory 30c in the DMA transfer mode. In this case, the image data is transferred in terms of any desired units.

In the above embodiment, an area to be captured is specified by a set of horizontal coordinates. However, an area to be captured may be specified by another set of parameters, e.g., a starting point and an area width. If image data is to be divided into equal areas, then the number of divided areas or the width of each of the divided areas may be specified.

The above embodiment is given by way of illustrative example only, and the present invention is not to be limited to the illustrated details.

In the above embodiment, a digital video signal is captured. However, the principles of the present invention are also applicable to an analog video signal by converting the analog video signal into a digital video signal.

Furthermore, while the host processor 30 and the video capture apparatus 40 are shown as being independent of each other in the above embodiment, the host processor 30 and the video capture apparatus 40 may be combined into a single circuit or may be constructed as three or more independent units.

According to the present invention, as described above, an image processing apparatus comprises an extracting circuit for extracting at least an area of still image data, a dividing circuit for dividing the area extracted by the extracting circuit into a plurality of first through nth areas, a memory circuit having a storage capacity smaller than a storage capacity required to store the still image data, for storing at least a portion of the image data of the first through nth areas provided by the dividing circuit, and a transfer circuit for transferring the image data stored in the memory circuit to an external device. Therefore, if an image processing system incorporating such an image processing apparatus is constructed as an LSI circuit, then the size of a necessary external memory added thereto can be reduced.

According to the present invention, a method of processing image data comprises the steps of extracting at least an area of still image data, dividing the extracted area into a plurality of first through nth areas, storing at least a portion of the image data of the divided first through nth areas in a memory circuit having a storage capacity smaller than a storage capacity required to store the still image data, and transferring the image data stored in the memory circuit to an external device. Therefore, the image data can be transferred using the memory circuit whose storage capacity is constant irrespective of the resolution of the image data.

According to the present invention, an image processing system comprises an image acquiring apparatus and an image processing apparatus for processing still image data acquired by the image acquiring apparatus, the image acquiring apparatus comprising an extracting circuit for extracting at least an area of still image data, a dividing circuit for dividing the area extracted by the extracting circuit into a plurality of first through nth areas, a first memory circuit having a storage capacity smaller than a storage capacity required to store the still image data, for storing at least a portion of the image data of the first through nth areas provided by the dividing circuit, and a transfer circuit for transferring the image data stored in the memory circuit to the image processing apparatus, the image processing apparatus comprising a receiving circuit for receiving the image data transferred by the transfer circuit, a second memory circuit having a storage capacity capable of storing the entirety of the still image data, and a restoring circuit for rearranging, as required, the image data received by the receiving circuit and storing the rearranged image data in the second memory circuit to restore the original image data. The image processing system thus arranged can be reduced in size.

The foregoing is considered as illustrative only of the principles of the present invention. Further, since numerous modification and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An image processing apparatus comprising:
   a dividing circuit for dividing a capture area of still image data into a plurality of first through nth areas such that dividing lines between the plurality of areas, into which the still image data is divided, run vertically;
   a memory circuit having a storage capacity smaller than a storage capacity required to store said still image data, for storing at least a portion of the image data of said first through nth areas provided by said dividing circuit; and
   a transfer circuit for transferring the image data stored in said memory circuit to an external device.

2. The image processing apparatus according to claim 1, further comprising:
   an extracting circuit for extracting at least a partial area of said still image data as said capture area.

3. The image processing apparatus according to claim 1, wherein said still image data comprises a plurality of fields, said dividing circuit dividing each of said fields into a plurality of first through nth areas.

4. The image processing apparatus according to claim 2, further comprising:
   an area specifying circuit for specifying an area to be extracted by said extracting circuit.

5. The image processing apparatus according to claim 1, wherein said memory circuit has a storage capacity for storing at least image data corresponding to a single scanning line of each of the areas provided by said dividing circuit, and said transfer circuit transfers image data corresponding to the scanning line stored in said memory circuit.

6. The image processing apparatus according to claim 5, wherein said transfer circuit transfers the image data corresponding to the scanning line stored in said memory circuit in a time until image data of a next scanning line starts to be stored in said memory circuit.

7. A method of processing image data, comprising the steps of:
   dividing a capture area of still image data into a plurality of first through nth areas such that dividing lines between the plurality of areas, into which the still image data is divided, run vertically;
   storing at least a portion of the image data of said divided first through nth areas in a memory circuit having a storage capacity smaller than a storage capacity required to store said still image data; and
   transferring the image data stored in said memory circuit to an external device.

8. An image processing system comprising:
   an image acquiring apparatus; and
   an image processing apparatus for processing still image data acquired by said image acquiring apparatus;
   said image acquiring apparatus comprising:
      a dividing circuit for dividing a capture area of still image data into a plurality of first through nth areas such that dividing lines between the plurality of areas, into which the still image data is divided, run vertically;
      a first memory circuit having a storage capacity smaller than a storage capacity required to store said still image data, for storing at least a portion of the image data of said first through nth areas provided by said dividing circuit; and
      a transfer circuit for transferring the image data stored in said first memory circuit to said image processing apparatus;
   said image processing apparatus comprising:
      a receiving circuit for receiving the image data transferred by said transfer circuit;
      a second memory circuit having a storage capacity capable of storing the entirety of said still image data; and
      a restoring circuit for rearranging, as required, the image data received by said receiving circuit and storing the rearranged image data in said second memory circuit to restore the original still image data.

9. The image processing system according to claim 8, further comprising:
   an extracting circuit for extracting at least a partial area of said still image data as said capture area.

10. The image processing system according to claim 8, wherein said still image data comprises a plurality of fields, said dividing circuit dividing each of said fields into a plurality of first through nth areas.

11. The image processing system according to claim 9, further comprising:
   an area specifying circuit for specifying an area to be extracted by said extracting circuit.

12. The image processing system according to claim 8, wherein said first memory circuit has a storage capacity for storing at least image data corresponding to a single scanning line of each of the areas provided by said dividing circuit, and said transfer circuit transferring image data corresponding to the scanning line stored in said memory circuit.

13. The image processing apparatus according to claim 12, wherein said transfer circuit transfers the image data corresponding to the scanning line stored in said first memory circuit in a time until image data of a next scanning line starts to be stored in said first memory circuit.

* * * * *